United States Patent
Yang et al.

(10) Patent No.: US 8,406,831 B2
(45) Date of Patent: Mar. 26, 2013

(54) ADJUSTMENT OF ELECTROMAGNETIC FIELDS PRODUCED BY WIRELESS COMMUNICATIONS DEVICES

(75) Inventors: Guangli Yang, South Setauket, NY (US); Sarika Jain, Vernon Hills, IL (US); Mike Verdecanna, Bayport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 429 days.

(21) Appl. No.: 12/774,147

(22) Filed: May 5, 2010

(65) Prior Publication Data
US 2011/0275406 A1    Nov. 10, 2011

(51) Int. Cl.
*H04M 1/00* (2006.01)

(52) U.S. Cl. .................. 455/575.7; 455/63.1; 455/90.3; 455/550.1; 455/575.1; 455/575.5; 455/114.2; 455/296; 343/702; 343/846; 343/847; 343/848; 343/849; 343/850; 343/851

(58) Field of Classification Search ............... 455/550.1, 455/575.1, 575.5, 90.3, 114.2, 296, 63.1, 455/501; 343/702, 846–851
See application file for complete search history.

(56) References Cited

U.S. PATENT DOCUMENTS

| | | | | |
|---|---|---|---|---|
| 6,657,595 B1 * | 12/2003 | Phillips et al. | ................. | 343/702 |
| 7,102,577 B2 * | 9/2006 | Richard et al. | ................. | 343/702 |
| 7,202,819 B2 * | 4/2007 | Hatch | ................. | 343/700 MS |
| 7,215,290 B2 * | 5/2007 | Cohen | ........................... | 343/702 |
| 7,477,796 B2 | 1/2009 | Sasaki et al. | | |
| 7,526,326 B2 | 4/2009 | Vance et al. | | |
| 7,633,449 B2 | 12/2009 | Oh et al. | | |
| 7,760,151 B2 * | 7/2010 | Poilasne et al. | ................. | 343/742 |
| 7,847,740 B2 * | 12/2010 | Dunn et al. | ................. | 343/702 |
| 8,259,026 B2 * | 9/2012 | Pulimi et al. | ................. | 343/846 |
| 2004/0122664 A1 | 6/2004 | Lorenzo et al. | | |
| 2005/0244022 A1 | 11/2005 | Muthuswamy et al. | | |
| 2006/0035607 A1 | 2/2006 | Hayes et al. | | |
| 2006/0140428 A1 | 6/2006 | Qi et al. | | |
| 2006/0214849 A1 | 9/2006 | Fabrega-Sanchez et al. | | |
| 2007/0032271 A1 | 2/2007 | Chan et al. | | |
| 2007/0090869 A1 | 4/2007 | Adewole et al. | | |
| 2007/0116308 A1 | 5/2007 | Zurek et al. | | |
| 2008/0113694 A1 | 5/2008 | Leyh et al. | | |
| 2008/0300029 A1 | 12/2008 | Liu et al. | | |
| 2009/0061966 A1 | 3/2009 | Yang | | |
| 2009/0170450 A1 | 7/2009 | Krenz et al. | | |
| 2009/0219214 A1 | 9/2009 | Oh et al. | | |
| 2009/0228608 A1 * | 9/2009 | Nysen et al. | ...................... | 710/1 |
| 2009/0231229 A1 | 9/2009 | Phillips et al. | | |
| 2010/0016024 A1 | 1/2010 | Yang et al. | | |
| 2010/0033380 A1 | 2/2010 | Pascolini et al. | | |

OTHER PUBLICATIONS

Kim, B., et al., Small Wideband PIFA for Mobile Phones at 1800 MHz, 2004 IEEE 59th Vehicular Technology Conference. VTC 2004-Spring (IEEE Cat. No. 04CH37514) IEEE, 2004.

* cited by examiner

*Primary Examiner* — Olumide T Ajibade Akonai

(57) ABSTRACT

Methods and apparatus are provided for adjusting the electromagnetic fields produced by telephones or other mobile devices capable of wireless communication. A wireless communication device includes a substrate having a ground plane. An antenna is coupled to the ground plane, and electrical currents are produced in the ground plane during operation of the antenna. A switchable counterpoise circuit that includes a conducting element and an inductor in series is provided on the substrate. The switchable counterpoise is selectively coupled to the ground plane based upon an operating mode of the wireless communications device, thereby adjusting the electrical currents flowing in the ground plane when the counterpoise is active. The changes in the ground plane currents can produce adjustments in the electromagnetic fields produced by the device, thereby improving hearing aid compatibility (HAC) of the device.

19 Claims, 6 Drawing Sheets

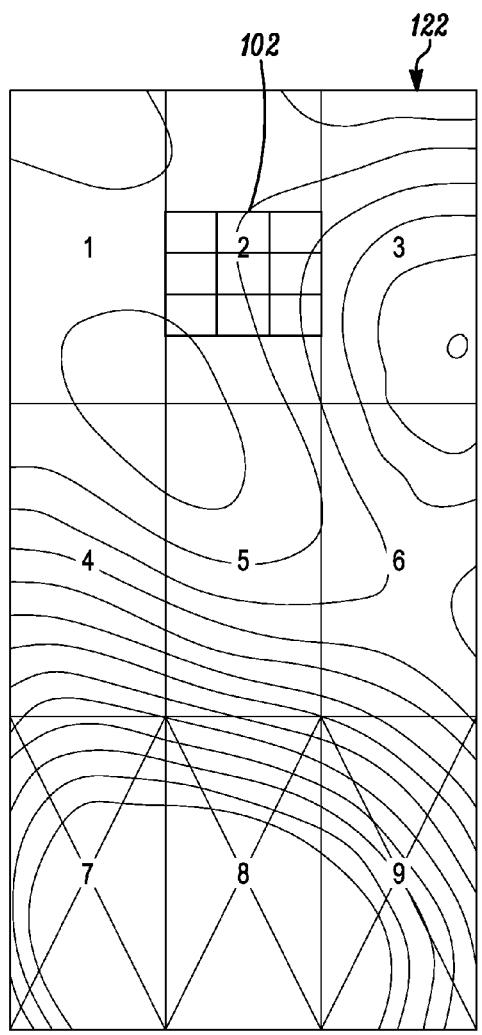 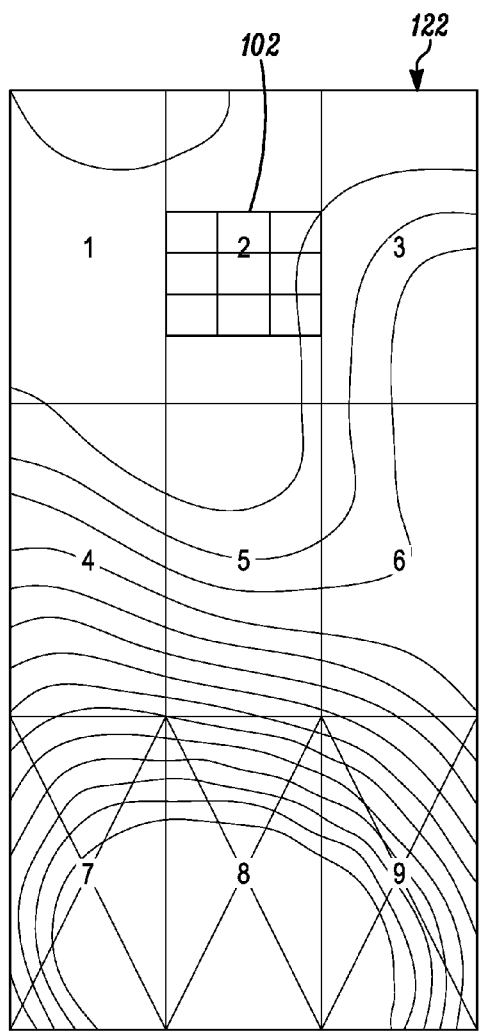
*FIG. 7*     *FIG. 8*

ADJUSTMENT OF ELECTROMAGNETIC FIELDS PRODUCED BY WIRELESS COMMUNICATIONS DEVICES

TECHNICAL FIELD

The following discussion generally relates to adjusting electromagnetic fields produced by mobile phones or other wireless communications devices. Such adjustments may be useful, for example, in improving hearing aid compatibility (HAC) with mobile phones or other devices.

BACKGROUND

Certain types of digital wireless phones have been known to be incompatible with hearing aids and other products that assist the hearing impaired. When a customer using a hearing aid or similar device places the mobile phone next to his or her ear, electromagnetic fields produced by the phone can interfere with the operation of the hearing aid. In some cases, this interference can produce buzzing, squealing or other audible effects that can be annoying and uncomfortable to the user.

Recently, the United States Federal Communications Commission (FCC) has adopted hearing aid compatibility (HAC) regulations that require certain mobile phones to be compatible with hearing aids and cochlear implants. Generally speaking, these regulations limit the amount of electromagnetic energy that a phone can produce within a defined physical space that is likely to come into close proximity to a hearing aid or similar device. The FCC HAC requirements for the 1900 MHz band, for example, stipulate that certain phones must avoid electric fields in excess of 38.5 dB-V/meter or magnetic fields in excess of −11.9 dB-A/meter in the spaces closest to the device's earpiece or speaker. The HAC requirements therefore reduce interference between a mobile phone and a hearing aid by limiting the electrical ("E") and magnetic ("H") fields that can be produced in close proximity to the hearing aid or similar device.

In view of the new government requirements and the desire to accommodate hearing impaired customers, it would be beneficial to provide mobile devices and techniques that reduce interference with hearing aids, cochlear implants and the like. It may also be beneficial to adjust the electromagnetic fields produced by mobile devices for reasons other than HAC compatibility. Other features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 7 is an exemplary diagram showing exemplary values of magnetic field intensity across the surface of a substrate when no counterpoise is active; and FIG. 8 is an exemplary diagram showing exemplary values of magnetic field intensity across the surface of a substrate when a counterpoise is active.

DETAILED DESCRIPTION

The following detailed description is merely illustrative in nature and is not intended to limit the invention or the application and uses of the invention. Furthermore, there is no intention to be bound by any express or implied theory presented in the preceding technical field or background or the following detailed description.

According to various embodiments, the electromagnetic fields produced by a mobile phone or other device are adjusted by providing a parasitic counterpoise that is activated or deactivated as needed to adjust currents that flow in the ground plane of the device. The switchable counterpoise is activated as needed to draw electrical current away from the ground plane of the mobile device, thereby changing the intensities of electromagnetic fields produced by the ground plane currents during operation of the device. Further, by placing the antenna and the counterpoise at a location that is relatively remote from the earpiece speaker, the position of the strongest electromagnetic fields can be moved away from the areas of greatest interest for HAC compliance, as desired. In various embodiments, a counterpoise element is provided as a conductor on a printed circuit board or other substrate that is coupled in series with an inductor. The inductor allows for shorter conductor lengths, thereby leading to a more compact design for a tuned resonant wavelength. Switching circuitry may also be provided so that the counterpoise is enabled and disabled based on the mode of operation, as described more fully below.

Figure 1:
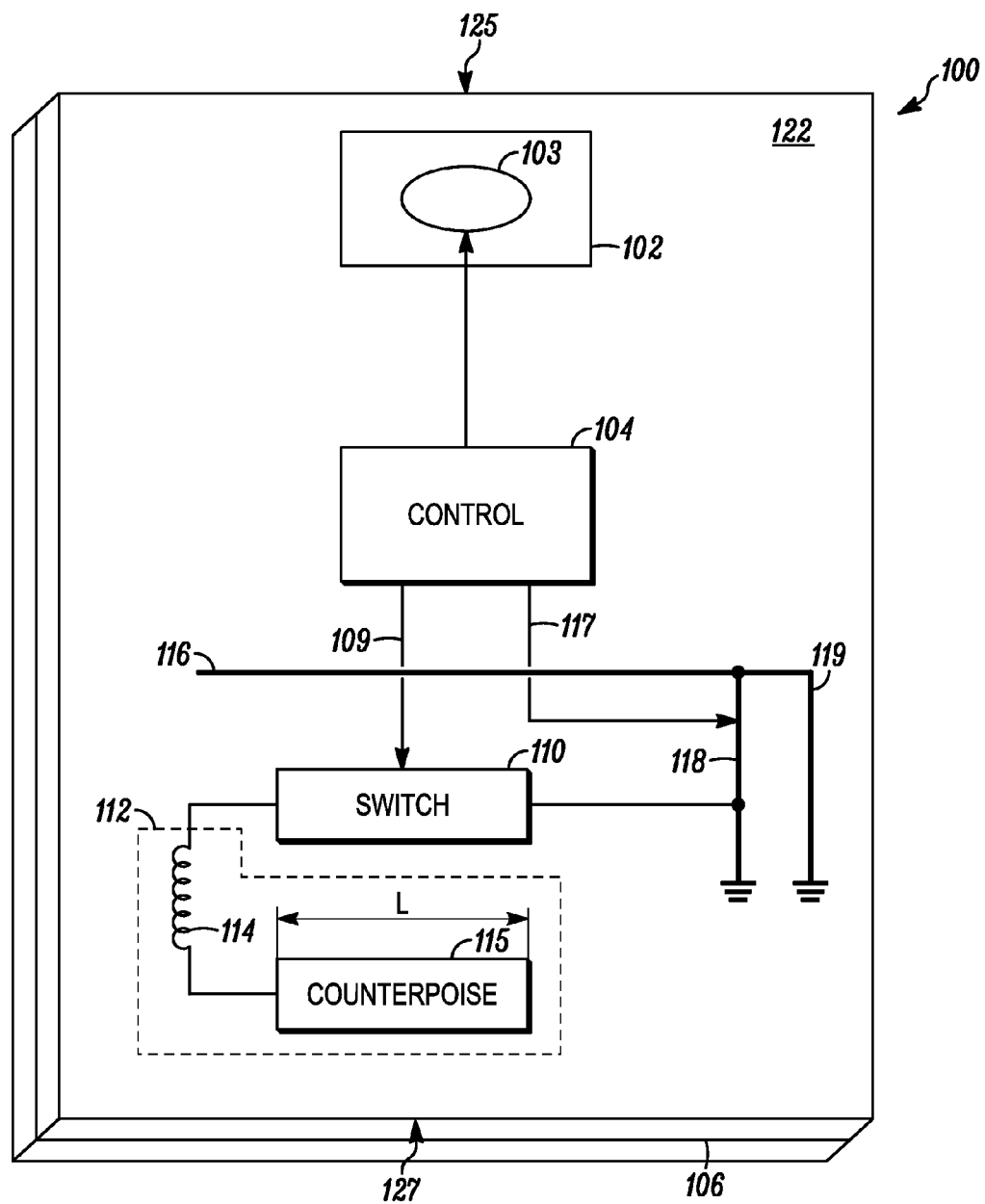
FIG. 1 is a block diagram of an exemplary mobile device that includes a switchable counterpoise.

Turning now to the drawing figures and with initial reference to FIG. 1, an exemplary mobile phone or other device 100 suitably includes a substrate 122 with an embedded ground plane 106. Substrate 122 mechanically supports and electrically interconnects an antenna 116, control circuitry 104, an earpiece speaker 103 and any number of other conventional components commonly found in a mobile phone or similar device. Substrate 122 may be implemented using a conventional printed circuit board (PCB) or the like. In some implementations, ground plane 106 is sandwiched between two layers or plastic or other dielectric material. The various components of device 100 may be electrically and mechanically connected to substrate 122 using conventional surface mount or other techniques as desired.

The "control circuitry" feature shown in FIG. 1 conceptually represents the various components that control and execute the functions of device 100. Control circuitry 104 may encompass any discrete and/or integrated components commonly found in a mobile device 100, including any sort of microprocessor, microcontroller, digital signal processor or other controller that is capable of directing the various functions of device 100 in response to any sort of hardware, software, firmware or other logic. Control circuitry 104 may also represent any additional sort of conventional analog or digital components used to perform other functions of device 100, even if such components are not specifically integrated with the control function. A mobile phone, for example, will typically include analog and/or digital components to amplify, filter, transmit and/or receive signals using antenna 116, and to decode and amplify audio signals that are provided to the user via earpiece speaker 103, as appropriate. Other types of devices 100 may use different components to perform different functions, but the concepts described herein may nevertheless be equivalently applied. Electromagnetic field adjustment or HAC compliance may be of interest in many types of devices 100 including mobile phones, mobile computers, wireless phones, media players, video game players, and many others.

As described more fully below, various embodiments of control circuitry 104 include appropriate hardware, software, firmware or other logic that determines the operating mode of device 100 based upon a transmit frequency or the like, and that activates or deactivates the counterpoise circuit 112 based upon the particular mode of operation. In various embodiments, control circuitry 104 provides one or more signals 109 to switching circuitry 110 so that the counterpoise 112 can be coupled or decoupled to the ground plane 106 when operating conditions warrant. Several examples of switching circuitry 110 and techniques are described more fully below.

FIG. 1 shows antenna 116 as a conventional planar inverted "F" antenna (PIFA) that connects to the ground plane 106 of substrate 122 via a feed connection 118 and one or more shorting connections 119. In this example, an output amplifier or other feature of control circuitry 104 provides signals 117 to be transmitted using the antenna 116 to the feed connection 118. During normal operation, applied signals 117 create excitation of electrical currents in both antenna 116 and in ground plane 106. The currents result in at least two different electromagnetic fields: one generated by the antenna 116, and another approximately-matched field generated by ground plane 106. The constructive (or destructive) interference of the two fields produces a combined signal that is ultimately received by the receiver. In a sense, then, a PIFA antenna 116 operates similar to a dipole antenna, with the ground plane 106 providing an additional radiating "pole" that works in conjunction with the "monopole" antenna 116. Equivalent techniques could be applied with other types of quarter wave antennas, including any types of printed, microstrip or other antennas 116, including folded inverted conformal antennas (FICAs) or the like.

In practice, the electromagnetic fields generated by the ground plane 106 can adversely affect hearing aid compatibility. In the example shown in FIG. 1, the earpiece speaker 103 is located proximate to a first end 125 of substrate 122 and antenna 116 is shown at an opposite end 127 of the substrate 122 to reduce the intensity of electrical and magnetic fields produced within the area of interest 102 surrounding the earpiece 103. Even though this embodiment provides a relatively large amount of physical separation between antenna 116 and antenna 116, however, interference can still occur. In particular, applied currents may be excited throughout the ground plane 106, which typically extends throughout the entire surface area of substrate 122 in the example shown in FIG. 1. These currents produce electrical and/or magnetic fields across the surface of substrate 122, including the area of interest 102. In devices with PIFAs or similar antennas 116, then, it can be a significant challenge to reduce or eliminate electromagnetic fields produced by the ground plane 106 within a particular region 102 due to the very nature of PIFA operation.

Various embodiments, however, provide additional parasitic elements that divert at least some of the current that would otherwise flow to the ground plane 106 to a different electrical path. FIG. 1 shows an example of a switchable counterpoise circuit 112 that includes a conductive element 115 and an inductor 114 formed on the substrate 122 that can be switched in or out of operation as desired to adjust the electromagnetic fields produced by the device 100. In this example, conductive element 115 is a metallic trace or other conductive feature that is printed or otherwise formed on substrate 122 using conventional techniques. In some implementations, conductive element 115 is a substantially linear conductive trace that is formed of copper, aluminum or any other conductive material on substrate 122. In some implementations conductive element 115 may extend on the surface of substrate 122 in a predominantly linear manner and in a direction that is selected to reduce the electromagnetic fields present in area 102. In the example shown in FIG. 1, the conductive element 115 runs essentially parallel to the nearest edge of the substrate 122, although other embodiments may be differently oriented as desired. When in use, counterpoise circuit 112 changes the intensities, directions and/or locations of currents flowing in the ground plane 106 that would otherwise result in electromagnetic fields in area 102. By reducing or eliminating the electrical and magnetic fields produced within area 102, interference with hearing aids and similar devices can be substantially reduced, if not eliminated.

Counterpoise circuit 112 may be selectively activated or deactivated by coupling or de-coupling to the counterpoise 112 to the ground plane 106 in any manner. In various embodiments, the counterpoise 112 is electrically coupled to the feed connection 118 of antenna 116 to create a dipole-like structure when the counterpoise 112 is active. In other embodiments, counterpoise 112 is simply coupled to the ground plane 106 via switching circuit 110 using conventional techniques.

In various embodiments, counterpoise circuit 112 and antenna 116 appropriately form a "quasi-balanced" structure similar to a dipole antenna when the counterpoise circuit 112 is active. The terms "quasi-balanced" or "substantially balanced" in this context are intended to convey that the counterpoise circuit is tuned to at least approximately balance the antenna 116 at one or more frequencies, even though perfect balancing may not be possible in all embodiments.

Tuning of the counterpoise circuit 112 may be accomplished in any manner. In various embodiments, the resonant frequency and/or impedance of the counterpoise circuit 112 may be adjusted as desired by varying a length ("L") of the conductive element 115, by varying the inductance of inductor 114, and/or by adjusting any other factors as desired. Generally speaking, a longer conductive element 115 will typically correspond a lower resonant frequency, and a shorter conductive element 115 will correspond to a higher resonant frequency. In various embodiments compatible with PCS frequencies, conductive element 115 is generally linear in shape and has a length (L) of about 10-15 mm (e.g., about 13.5 mm in one example), although other embodiments may be formed of different shapes and dimensions. Inductor 114 may be used to reduce the effective length of the conductive element 115 as desired. Increased inductance at inductor 114, for example, will typically reduce the corresponding length of the conductive element 115. Conversely, for a given length (L) of conductive element 115, the inductance of inductor 114 can be adjusted upwardly or downwardly to tune counterpoise circuit 112 to a desired frequency.

Figure 2:
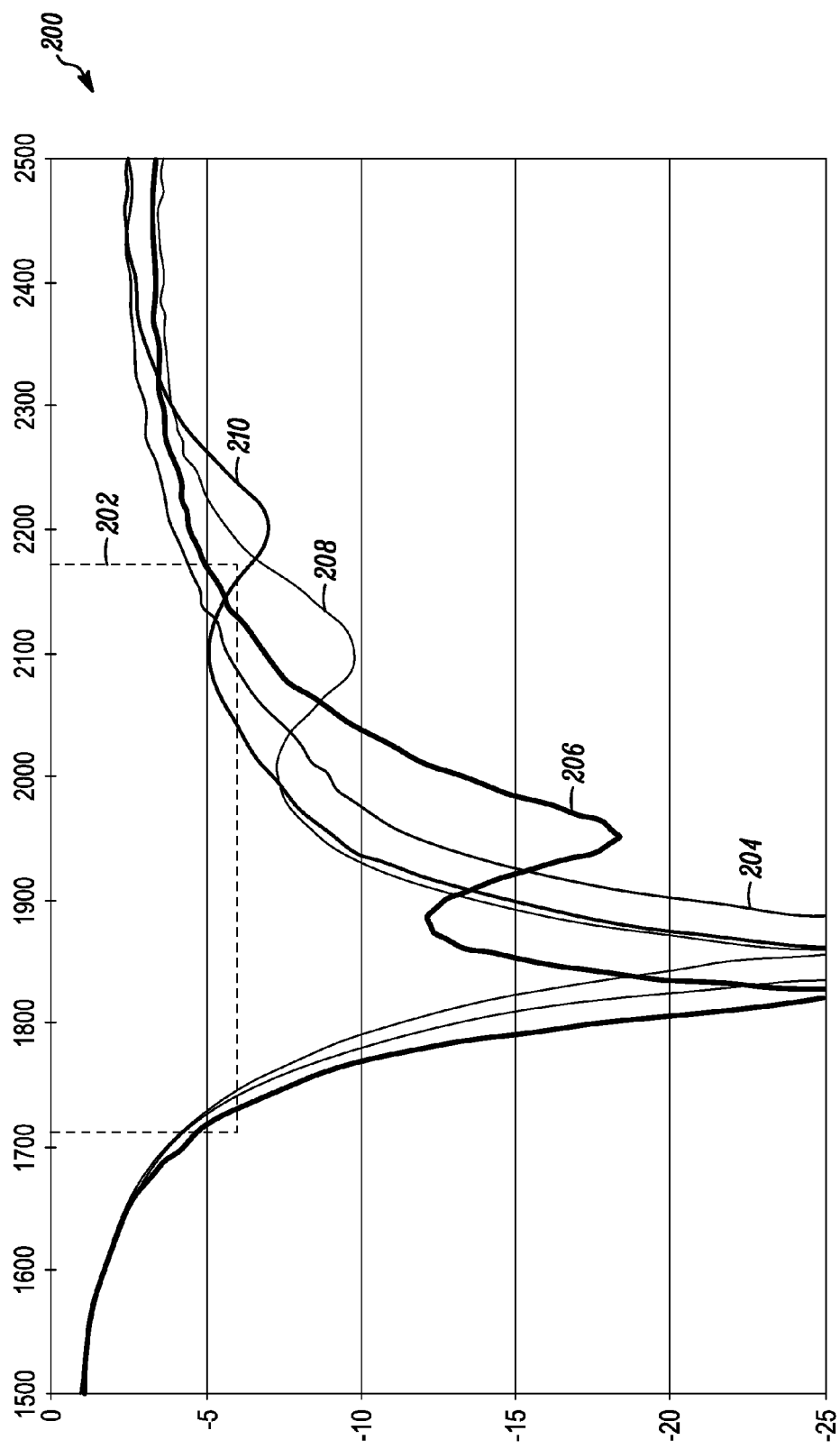
FIG. 2 is an exemplary plot of return loss versus frequency for several different counterpoise circuits.
Figure 3:
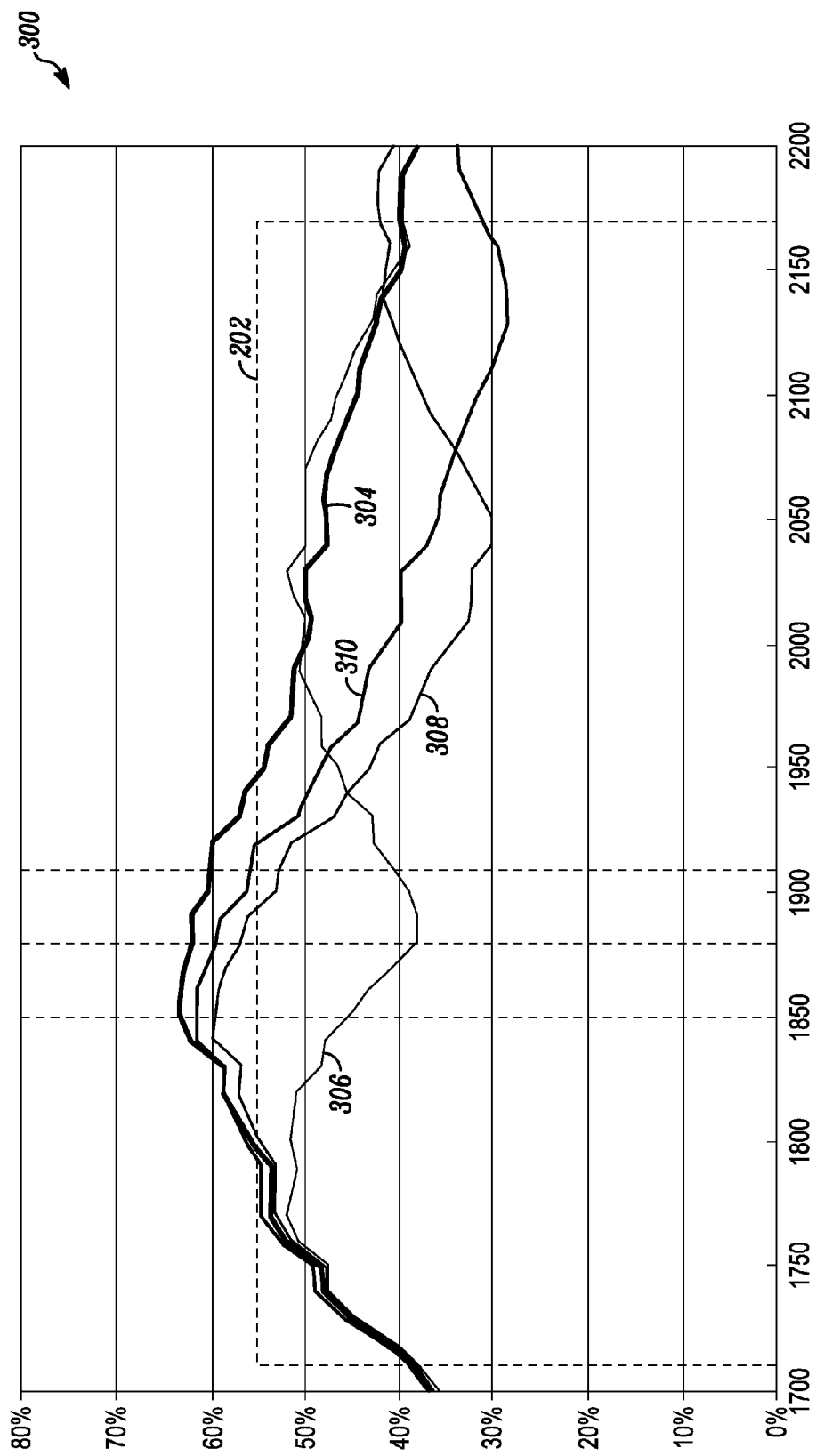
FIG. 3 is an exemplary plot of efficiency versus frequency for several different counterpoise circuits.

FIGS. 2 and 3 provide exemplary data that can assist in tuning the counterpoise circuit 112 to a desired frequency.

FIG. 2 is a plot 200 of return loss (in dB) versus frequency for various implementations of counterpoise circuit 112, and FIG. 3 is a plot 300 of free space efficiency versus frequency. Box 202 in both figures shows a frequency band of interest, such as the Personal Communications Service (PCS) frequency band around 1900 MHz that is commonly used for mobile phone service in North America. Lines 204 and 304 represent operation when no counterpoise circuit 112 present or the counterpoise circuit 112 disabled. Lines 206 and 306 represent operation with a counterpoise circuit 112 with a 15 mm conductive element 115 and a 10 nH inductor 114 (corresponding to a counterpoise circuit 112 tuned to about 1950 MHz in this example). Lines 208 and 308 represent operation with a 15 mm conductive element 115 and a 8.2 nH inductor 114 (corresponding to tuning to about 2050 MHz in this example), and lines 210 and 310 reflect operation with a 15 mm conductive element 115 and a 6.8 nH inductor 114 (corresponding to about 2200 MHz in this example). The particular values of conductor lengths, inductances and the resultant tuned frequencies may vary significantly in other embodiments.

From FIG. 2, it can be shown that when no counterpoise circuit 112 is operational (line 204), only a single resonance occurs near the resonant frequency of the antenna 116 (e.g., at about 1900 MHz in this example). Adding the counterpoise 112 (lines 206, 208, 210) adds an additional resonant frequency corresponding to the tuned frequency of the counterpoise 112. Selecting a counterpoise 112 that has a resonant frequency within (or at least near) the band of interest improves the bandwidth of the system, and may also reduce electromagnetic fields emitted within that band. The counterpoise 112 therefore assists in reduction of electromagnetic fields that may create compatibility issues with hearing aids or the like when the device 100 is operated within the band of interest 202.

By comparing line 304 with lines 306, 308 and 310 in FIG. 3, however, it can be readily observed that efficiently undesirably degrades over certain frequency bands when the counterpoise 112 is operational. Comparing lines 304 and 306 at 1900 MHz in FIG. 3, for example, shows an efficiency reduction of about 20% when a counterpoise 112 having a resonant frequency of about 1900 is activated. Lines 308 and 310 in FIG. 3 also show some reduction in efficiency, but mostly at frequencies closer to the resonant frequencies of the counterpoise 112 (i.e., at about 2050 and 2200 MHz, respectively). Generally speaking, then, FIGS. 2 and 3 indicate that the counterpoise 112 will generate weaker electromagnetic fields but greater reductions in efficiency near its tuned resonant frequency.

The various lines in FIGS. 2 and 3 therefore represent several different design options that may be selected based upon the requirements and parameters of the particular embodiment. By designing counterpoise 112 to have a resonant frequency that lies outside the primary band of interest (e.g., the PCS transmit band between 1850 and 1910 MHz), the reduction in efficiency can be reduced while maintaining much of the reduction in undesired electromagnetic field intensity. Designing the counterpoise 112 to have a resonant frequency of about 2050 MHz (corresponding to lines 208 and 308 in FIGS. 2 and 3) in this example would provide significant reduction in field intensity without substantially degrading the efficiency during operation within the band of interest. This option would, however, exhibit reduced efficiency for operation at frequencies closer to 2050 MHz, as shown in FIG. 3. Again, the particular parameters of the counterpoise 112 can be selected to provide whatever operating characteristics are most beneficial for the particular embodiment.

Further, the counterpoise circuit 112 may be switchably activated or deactivated in any manner. When device 100 is transmitting on a frequency that is relatively close to the tuned resonant frequency of the counterpoise 112, for example, it may be desirable to temporarily deactivate the counterpoise 112 to avoid the reduction in efficiency reflected in FIG. 3. This can be particularly useful in devices 100 that operate in multiple frequency bands, such as most mobile phones and the like. If counterpoise 112 is designed to have a resonant frequency of about 2050 Mhz, for example, line 208 in FIG. 2 would indicate that an active counterpoise 112 may be beneficial during operation at about 1900 MHz (corresponding to conventional PCS voice communications). Line 308 in FIG. 3 would indicate, however, that the counterpoise 112 may be detrimental during operation at about 2100 MHz (corresponding to certain Universal Mobile Telecommuncations System (UMTS) communications). As a result, it may be desirable in some embodiments to activate the counterpoise 112 when transmitting at certain frequencies (e.g., in the 1900 MHz range in this example) while deactivating the counterpoise 112 when operating at other frequencies (e.g., the 2050-2100 MHz range). This may be accomplished by switchably coupling the counterpoise 112 to the ground plane 106 during operation at beneficial frequencies and then decoupling the counterpoise 112 from the ground plane 106 when use of counterpoise 112 would be detrimental.

Figure 4:
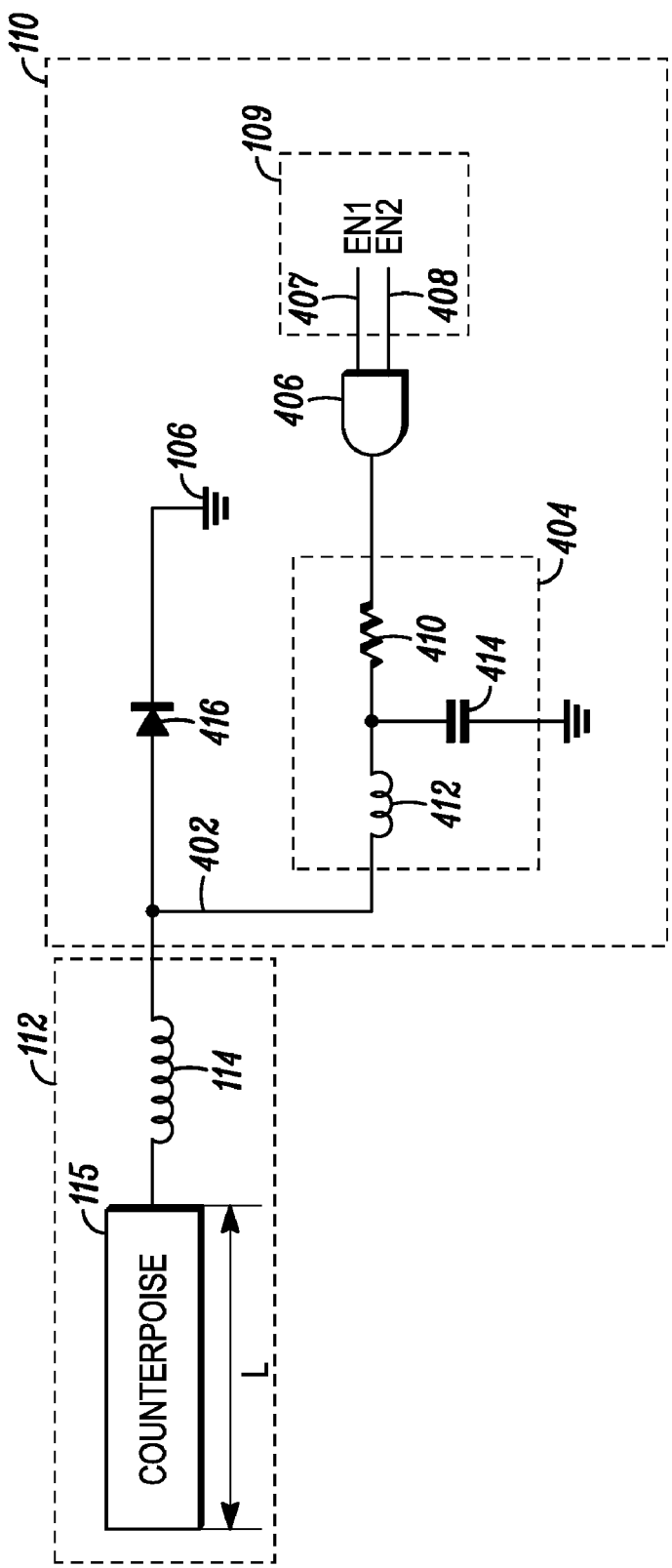
FIG. 4 is a circuit diagram of an exemplary switching circuit.

Counterpoise 112 may be switchably coupled to the ground plane 106 (or another appropriate node) in any convenient manner. FIG. 4 shows an example of switching circuit no that could be used in some embodiments. With reference to FIG. 4, conductive element 115 and inductor 114 are coupled in series with each other to form a counterpoise 112 that is tuned to an appropriate resonant frequency, as described above. In some embodiments counterpoise 112 may be coupled to the ground plane 106 via the feed connection 118 of antenna 116. Other embodiments may simply connect counterpoise 112 to the ground plane using a connection through substrate 122 or the like.

Switching circuit 110 appropriately creates a series connection to ground plane 106 or another appropriate electrical node when the operation of device 100 favors the use of the counterpoise 112. Counterpoise 112 may be decoupled from the ground plane 106 when the device is operating in a frequency range or other mode wherein use of the counterpoise 112 would be undesirable. Switching circuit no therefore switchably couples or decouples the counterpoise 112 to the ground plane 106 in response to applied control signals 109, which may be provided from a digital controller or other component of control circuitry 104 (FIG. 1).

Switching circuit 110 suitably includes a switching element 416 that can be actuated or otherwise affected by a switching signal 402 to activate or deactivate the counterpoise 112. In the embodiment shown in FIG. 4, switching element 416 is a diode that is normally reverse-biased to create an open circuit (or similar) condition. When an appropriate switching signal 402 is applied, the bias of the diode is overcome, and the coupling is made between the counterpoise 112 and the ground plane 106. Equivalent embodiments may replace the diode with a relay, switch, field effect transistor (FET) or other switching element 416 as desired.

Switching may be implemented in any manner. In the example shown in FIG. 4, switching circuit no receives a pair of control signals 109 from the control circuitry 104 that indicates the current operating mode of device 100. Signal 407 suitably provides a binary flag that indicates whether the device 100 is in a transmit or a receive mode. Generally speaking, electromagnetic fields are strongest when device 100 is transmitting, so counterpoise 112 may not be needed when the device is not in an active transmit mode. Signal 408 in this example is another binary indicator for a particular frequency band, such as a PCS band 202 (FIGS. 2-3), the UTMS band, or the like. Other embodiments could provide any sort of additional or alternate control signals 109 to activate or de-activate counterpoise 112 according to any desired criteria.

FIG. 4 shows the two switching signals 407 and 408 as being provided to a conventional AND gate 406 to determine that the device is transmitting within a frequency band of interest. If both signals 407 and 408 represent logically high values in this example, then the switching signal 402 is also set high, thereby overcoming the bias of diode 416 and establishing the coupling between counterpoise 112 and ground plane 106. If the device 100 is transmitting within the PCS band 202 described above, for example, both signals 407 and 408 may be active, resulting in signal 402 going high and establishing the coupling between counterpoise 112 and ground plane 106. Conversely, if either or both of input signals 407 or 408 are logically low, then switching signal 402 remains low, diode 416 remains reverse biased, and an open circuit (or similar) condition is created between the counterpoise 112 and the ground plane 106. In this case, the counterpoise circuit 112 remains "floating" or otherwise decoupled from the ground plane 106, so the counterpoise 112 is inactive. The particular logic used in this example could be modified in many different ways. Diode 416 could be reversed, for example, along with the polarity of the various signals 402, 407 and/or 408. In some equivalent embodiments, counterpoise 112 could remain coupled to ground plane 106 such that the counterpoise 112 remains in use unless it is actively decoupled from ground plane 106.

Various embodiments may also provide a filter circuit 404 as appropriate. In the exemplary embodiment shown in FIG. 4, filter circuit 404 includes a resistor 410 and capacitor 414 to bypass any noise associated with the switching signal 402 as desired. In various embodiments, resistor 410 is relatively large (e.g., on the order of 1K ohms or so) and capacitor 414 is relatively small (e.g., on the order of 33 pF or so), although other embodiments may use different values. Filter circuit 404 as shown in FIG. 4 also includes an inductor 412 that acts as a radio frequency (RF) choke. Inductor 412 therefore has an appropriate inductance to block RF signals propagating within device 100. In a device operating at or near PCS frequencies, for example, an appropriate inductance may be on the order of 33 nH or so, although other implementations may use other values. Other embodiments may provide additional or alternate elements arranged in any topology, and/or may use elements having different impedance, capacitance or inductance values from those described herein.

In operation, then, a mobile phone or other device 100 suitably includes a switchable counterpoise circuit 112 that includes a conductive element 115 and an inductor 114 that are disposed on a PCB or similar substrate 122 and that are tuned to a particular resonant frequency. The conductive elements 115 and inductor 114 are switchably coupled to the ground plane 106 of the substrate 122 to thereby allow activation or deactivation based upon the operating mode of the device 100. If the device 100 is transmitting within a frequency band of interest, for example, the counterpoise 112 may be activated to draw current away from the ground plane 106 (e.g., via the feed connection 118 of antenna 116), thereby reducing the effects of electromagnetic fields in the area of interest 102 near earpiece speaker 103. As the device 100 shifts to a different operating mode (e.g., a mode that involves transmitting or receiving on a different operating frequency), the counterpoise 112 may be de-coupled from the ground plane 106 to improve efficiency, or for any other purpose.

Figure 5:
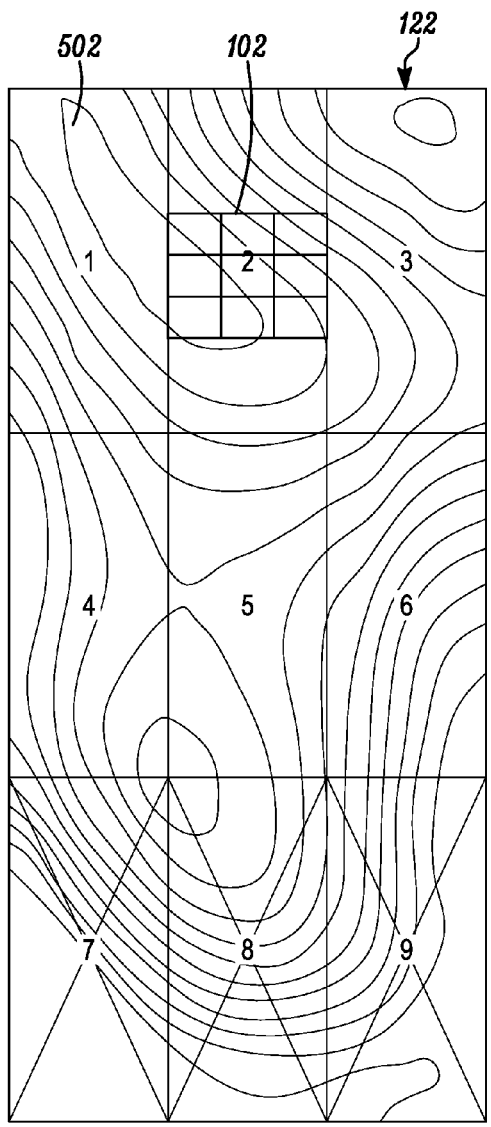
FIG. 5 is an exemplary diagram showing exemplary values of electrical field intensity across the surface of a substrate when no counterpoise is active.
Figure 6:
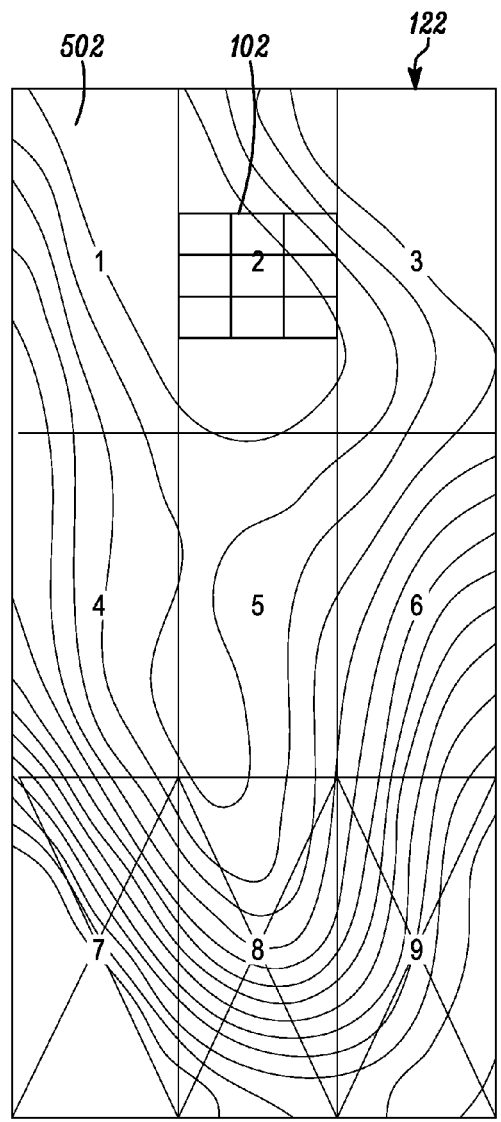
FIG. 6 is an exemplary diagram showing exemplary values of electrical field intensity across the surface of a substrate when a counterpoise is active.

In practice, it has been observed that the counterpoise 112 can have significant effects upon electromagnetic fields occurring within the area of interest 102 near the earpiece speaker 103. FIG. 5, for example, shows the intensity of exemplary electrical fields (E) observed across the surface of a PCB substrate 122. FIG. 6 shows the electrical field as it occurs when a counterpoise 112 is activated. By comparing FIG. 6 to FIG. 5, it is apparent that electrical fields 502 occurring near the region of interest 102 have been moved away from the earpiece speaker 103 and have been reduced in intensity.

FIGS. 7 and 8 show similar results for the magnetic field (H). FIG. 7 shows magnetic fields when no counterpoise 112 is active, and FIG. 8 shows a similar plot of the fields resulting when the counterpoise is active. In comparing FIG. 8 to FIG. 7, it is readily apparent that the magnetic fields that occur in region 202 when the counterpoise 112 is not present are substantially reduced, if not eliminated, when the counterpoise 112 is activated.

By designing a switchable counterpoise 112 on substrate 122 that provides a quasi-balanced antenna structure in conjunction with antenna 116, then, the currents flowing in ground plane 106 can be adjusted, thereby leading to reduced electromagnetic fields that can interfere with hearing aids, cochlear implants and/or the like. Similar structures and techniques may provide other benefits in addition to HAC compliance as well.

For the sake of clarity, it should be noted that various systems, devices and methods may have been described herein in terms of functional and/or logical block components and various processing steps. It should be appreciated that such block components may be realized by any number of hardware, software, and/or firmware components configured to perform the specified functions. For example, an embodiment of a system or a component may employ various discrete or integrated circuit components (e.g., memory or other data storage elements, digital processing elements, logic elements, look-up tables, or the like) that may not have been expressly described herein, but that would nevertheless be understood by those skilled in the art to be useful in some implementations. Many of these elements may carry out a variety of functions under the control of one or more microprocessors, microcontrollers, digital signal processors or other control devices executing software, firmware or similar instructions. Such instructions may be stored in read-only, random access, flash or other memory, or in any other optical, magnetic or other tangible storage medium as desired.

The following description may refer to elements or nodes or features being "connected" or "coupled" together. As used herein, unless expressly stated otherwise, "connected" means that one element/node/feature is directly joined to (or directly communicates with) another element/node/feature in a physical, mechanical, logical or other manner. Likewise, unless expressly stated otherwise, "coupled" means that one element/node/feature is directly or indirectly joined to (or directly or indirectly communicates with) another element/node/feature in a physical, mechanical, logical or other sense to facilitate communication or other interaction between the "coupled" components. Components that are "coupled" together, then, will typically have at least some electrical or electronic communication or other interaction between the coupled components even though one or more intervening elements may (or may not be) present. The term "exemplary" is used in the sense of providing an "example, instance, or illustration" rather than a "mode" that is intended to be precisely imitated.

While at least one example has been presented in the foregoing detailed description, it should be appreciated that a vast number of equivalent variations exist. Although the prior discussion emphasizes mobile telephones for convenience, equivalent embodiments may be implemented in any sort of wireless communications device including any sort of notebook or tablet computer, video game player, media player, personal digital assistant and/or the like that is configured to communicate with any sort of mobile telephone networks, local area networks, wide area networks and/or the like. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims and their legal equivalents.

What is claimed is:

1. A wireless communications device comprising:
a substrate having a ground plane;
an antenna coupled to the ground plane such that electrical currents are produced in the ground plane during operation of the antenna;
a switchable counterpoise comprising a conductive element and an inductor coupled in series on the substrate, wherein the switchable counterpoise is selectively coupled to the ground plane based upon an operating mode of the wireless communications device to thereby adjust the electrical currents flowing in the ground plane when the switchable counterpoise is coupled to the ground plane; and
switching circuitry configured to couple the conductive element and the inductor to the ground plane when the wireless communications device is transmitting within a particular frequency band, and to otherwise decouple the conductive element and the inductor from the ground plane.

2. The wireless communications device of claim 1 wherein the conductive element is printed on the substrate.

3. The wireless communications device of claim 1 wherein the conductive element extends in a predominantly linear manner on the substrate.

4. The wireless communications device of claim 3 wherein the inductor is a lumped element inductor.

5. The wireless communications device of claim 1 further comprising a speaker located proximate to a first end of the substrate, and wherein the counterpoise is located at an opposite end of the substrate from the speaker.

6. The wireless communications device of claim 1 wherein the antenna is a planar inverted F antenna (PIFA).

7. The wireless communication device of claim 6 wherein the antenna is coupled to the ground plane via a feed connection and a shorting connection.

8. The wireless communication device of claim 7 wherein the switchable counterpoise is coupled to the ground plane via the feed connection.

9. A wireless communications device comprising:
a substrate having a ground plane;
an antenna coupled to the ground plane such that electrical currents are produced in the ground plane during operation of the antenna; and
a switchable counterpoise comprising a conductive element and an inductor coupled in series on the substrate, wherein the switchable counterpoise is selectively coupled to the ground plane based upon an operating mode of the wireless communications device to thereby adjust the electrical currents flowing in the ground plane when the switchable counterpoise is coupled to the ground plane, wherein the antenna and the ground plane are configured to produce a first electromagnetic field when the counterpoise is not coupled to the ground plane, and wherein the antenna and the counterpoise are configured to produce a second electromagnetic field different from the first electromagnetic field when the counterpoise is coupled to the ground plane.

10. A mobile phone for communicating on a plurality of frequency bands, the mobile phone comprising:
a printed circuit board housing a ground plane;
a speaker disposed on the printed circuit board proximate a first end of the mobile phone;
an antenna coupled to the ground plane and disposed at an opposite end of the printed circuit board from the speaker;
a counterpoise circuit comprising an inductor connected in series with a conductive element at the opposite end of the printed circuit board from the speaker; and
switching circuitry configured to switchably couple the counterpoise circuit to the ground plane when the mobile phone is transmitting in a first one of the frequency bands and to decouple the counterpoise circuit from the ground plane when the mobile phone is transmitting in a second one of the frequency bands.

11. The mobile phone of claim 10 wherein the antenna produces an first electromagnetic field in conjunction with the counterpoise circuit when the counterpoise circuit is coupled to the ground plane, and wherein the antenna produces a second electromagnetic field in conjunction with the ground plane when the counterpoise circuit is not coupled to the ground plane.

12. The mobile phone of claim 11 wherein an intensity of the first electromagnetic field measured at the speaker is less than an intensity of the second electromagnetic field measured at the speaker.

13. The mobile phone of claim 10, wherein the conductive element comprises a predominantly linear shaped conductor printed on the printed circuit board.

14. The mobile phone of claim 10 wherein the antenna is a planar inverted F antenna (PIFA) that is coupled to the ground plane via a feed connection and a short connection.

15. The mobile phone of claim 14 wherein the switching circuitry is configured to couple the counterpoise circuit to the ground plane via the feed connection.

16. The mobile phone of claim 10 wherein the switching circuitry comprises a diode that is biased in a first direction when the mobile phone is communicating in the first one of the frequency bands and in a second direction opposite the first direction when the mobile phone is communicating in the second one of the frequency bands.

17. A method for operating a mobile phone having a ground plane, an antenna coupled to the ground plane, and a counterpoise circuit, the method comprising:

determining an operating mode of the mobile phone;
when the mobile phone is operating in a first operating mode, coupling the counterpoise circuit to the ground plane to thereby form a substantially balanced structure between the counterpoise circuit and the antenna; and
when the mobile phone is operating in a second operating mode different from the first operating mode, decoupling the counterpoise circuit from the ground plane.

18. The method of claim 17 wherein the determining comprises identifying when the mobile phone is transmitting within a particular frequency band.

19. The method of claim 17 wherein the coupling of the counterpoise circuit to the ground plane comprises coupling the counterpoise circuit to a feed connection of the antenna.

* * * * *